April 26, 1927.  J. CODER ET AL  1,626,185

TRACTOR TRAILER OF THE TYPE CARRIED ON TWO WHEELS

Filed June 25, 1926

Patented Apr. 26, 1927.

1,626,185

UNITED STATES PATENT OFFICE.

JOSEPH CODER AND LOUIS CODER, OF ST-MARCEL-LES-MARSEILLE, FRANCE.

TRACTOR TRAILER OF THE TYPE CARRIED ON TWO WHEELS.

Application filed June 25, 1926, Serial No. 118,522, and in France April 26, 1926.

This invention relates to improvements in tractor trailers of the type carried on two wheels and in which means are provided for retaining it in the normal position when disconnected from the tractor.

According to the invention an additional wheel is pivotally mounted on the chassis means being provided for raising it vertically into a casing when the trailer is connected up to the tractor consisting in carrying the wheel on arms the upper ends of which are pivotally connected to nuts travelling on left and right handed horizontal screws suitable gearing being provided for rotating the screws.

The invention will be described with reference to the accompanying drawings.

Figure 1:
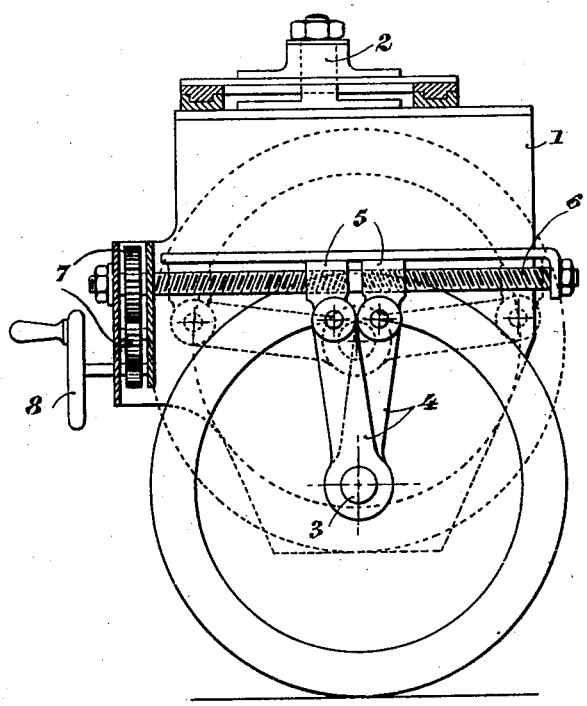
Fig. 1 is a side elevation partly in section.
Figure 2:
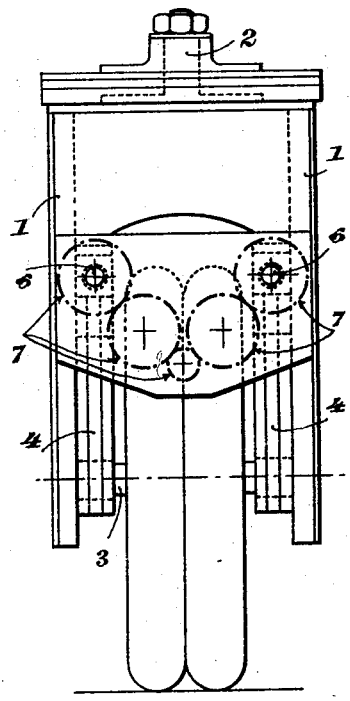
Fig. 2 is a front elevation of same.

A frame is pivotally connected to the trailer chassis by a stud 2. The frame is formed with two depending side members 1 provided with slides in which the axle 3 of a wheel can slide. The axle 3 is connected to the frame by four arms 4, two at each side of the wheel each arm being pivotally connected to a nut 5, the nuts 5 on one side of the wheel being mounted on one right and left handed screw 6 and those on the other side of the wheel on a second right and left handed screw 6.

The screws 6 are rotated by a train of gearing 7 controlled by a hand wheel 8.

On account of the screws having a left and right handed pitch a rotation in one direction will bring the two nuts on each screw nearer together and that in the reverse direction will separate them giving a downward or upward movement respectively to the axle 3 and wheel. In this way the wheel can be brought into or removed from contact with the ground.

In order to facilitate the manœuvring of the trailer the pivot pin 2 can be loosened so that the casing can be readily rotated in a vertical plane by pushing the trailer draw bar.

An arrangement as described has the advantage that the support can be raised when the trailer is connected to the tractor but the trailer is readily moved when disconnected therefrom.

If two two-wheeled trailers are coupled to a tractor the frame of the supporting wheel of the second trailer is connected to the chassis of the first by a coupling rod and can be used as a front bogey.

What we claim as our invention and desire to protect by Letters Patent is:—

1. A supporting wheel for a two wheeled trailer comprising in combination with the trailer a frame pivoted thereto depending sides on the frame forming slides for the wheel axle, left and right handed screws carried horizontally by the frame, nuts thereon, and arms connected to the nuts and to the wheel axle so that the wheel axle is supported by the screws and whereby on the rotation of the screws the wheels can be raised and lowered.

2. A supporting wheel for a two wheeled trailer comprising in combination with the trailer a frame pivoted thereto, depending sides on the frame forming slides for the wheel axle, left and right handed screws carried horizontally by the frame, nuts thereon, arms connected to the nuts and to wheel axle, so that the wheel axle is supported by the screws and a train of gearing and a hand wheel for rotating the screws whereby the wheels can be raised and lowered.

3. A supporting wheel for a two wheeled trailer comprising in combination with the trailer a frame pivoted thereto, depending sides on the frame forming slides for the wheel axle, two left and right handed screws carried horizontally by the frame, two nuts on each screw, two pairs of arms pivoted to the wheel axle one on each side of the wheel each arm of each pair being pivoted to a nut so that the wheel axle is supported by the screws and whereby on the rotation of the screws the wheels will be raised and lowered.

4. A device for raising and lowering an auxiliary supporting wheel for a two wheeled trailer, said device comprising in combination with the trailer chassis, a frame pivotally connected to said chassis, two depending side members mounted on said frame, forming slide members for the wheel axle, rotatable screwed rods respectively threaded in opposite directions from the center towards the ends and supported in bearings stationarily mounted on said frame, nuts in positive engagement with the threads of said rods, arms connected to said nuts and said wheel axle whereby on the rotation of said screwed rods the wheel can be raised and lowered.

5. A device for raising and lowering an auxiliary supporting wheel for a two wheeled trailer, said device comprising in combination with the trailer chassis, a frame pivotally connected to said chassis, two depending side members provided on each side of the pivot of said frame and forming slides for the wheel axle, two rotatable left and right handed screwed rods each of which being supported in bearings stationarily mounted on said frame, two nuts in positive engagement with the threads on each screwed rod, two pairs of arms pivoted to the wheel axle on each side of the wheel, each arm of each pair of arms being pivoted to one of foresaid nut whereby on the rotation of the screwed rods the wheel can be raised and lowered.

6. A device for raising and lowering an auxiliary supporting wheel for a two wheeled trailer, said device comprising in combination with the trailer chassis, a frame pivotally connected to said chassis, two depending side members mounted on said frame, forming slide members for the wheel axle, rotatable left and right handed screwed rods supported in bearings stationarily mounted on said frame, nuts in positive engagement with the threads of said rods, arms connected to said nuts and said wheel axle, a train of gearing and a hand wheel for acting on said rods whereby the wheel can be raised and lowered.

In witness whereof we affix our signatures.

JOSEPH CODER.
LOUIS CODER.